April 17, 1951 A. J. FERRELL ET AL 2,549,301
ARTICULATED GRAIN CAR DOOR
Filed July 19, 1949 2 Sheets-Sheet 1
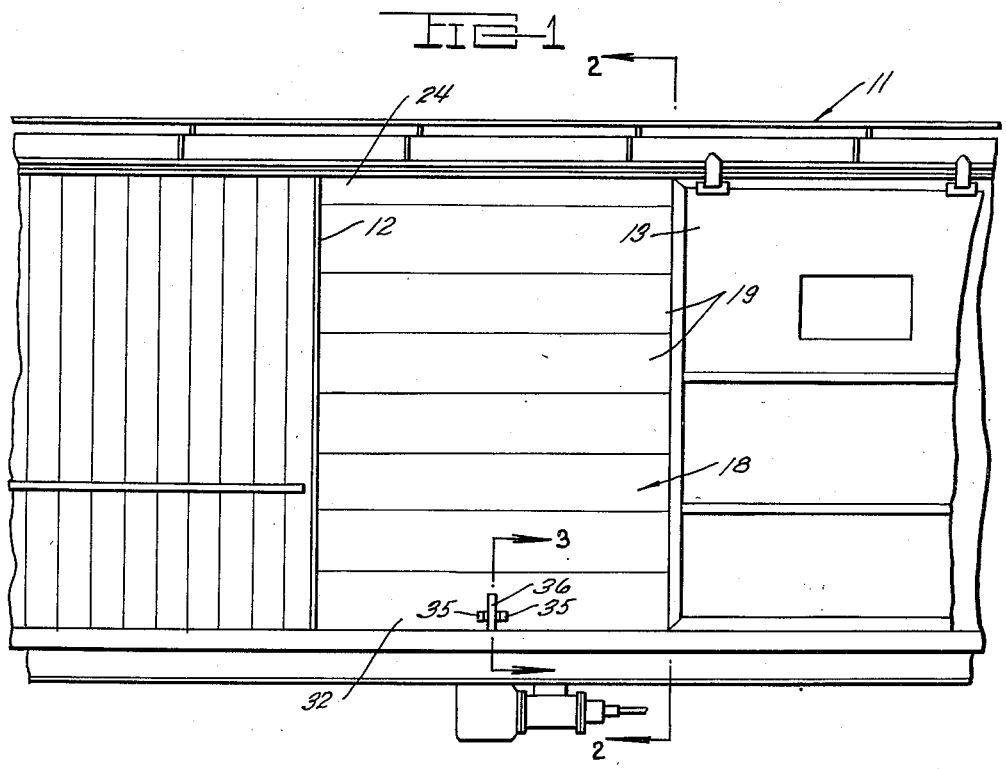
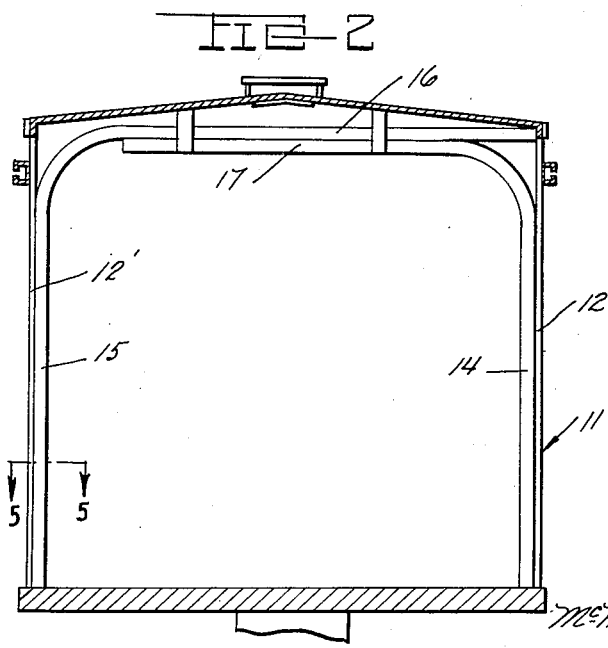
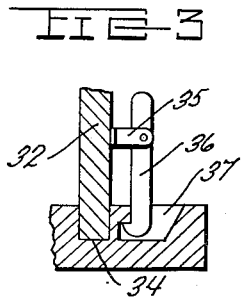
INVENTORS
ALTON J. FERRELL and
PATRICK J. McENROE, JR.
BY McMorrow, Berman + Davidson
ATTORNEYS

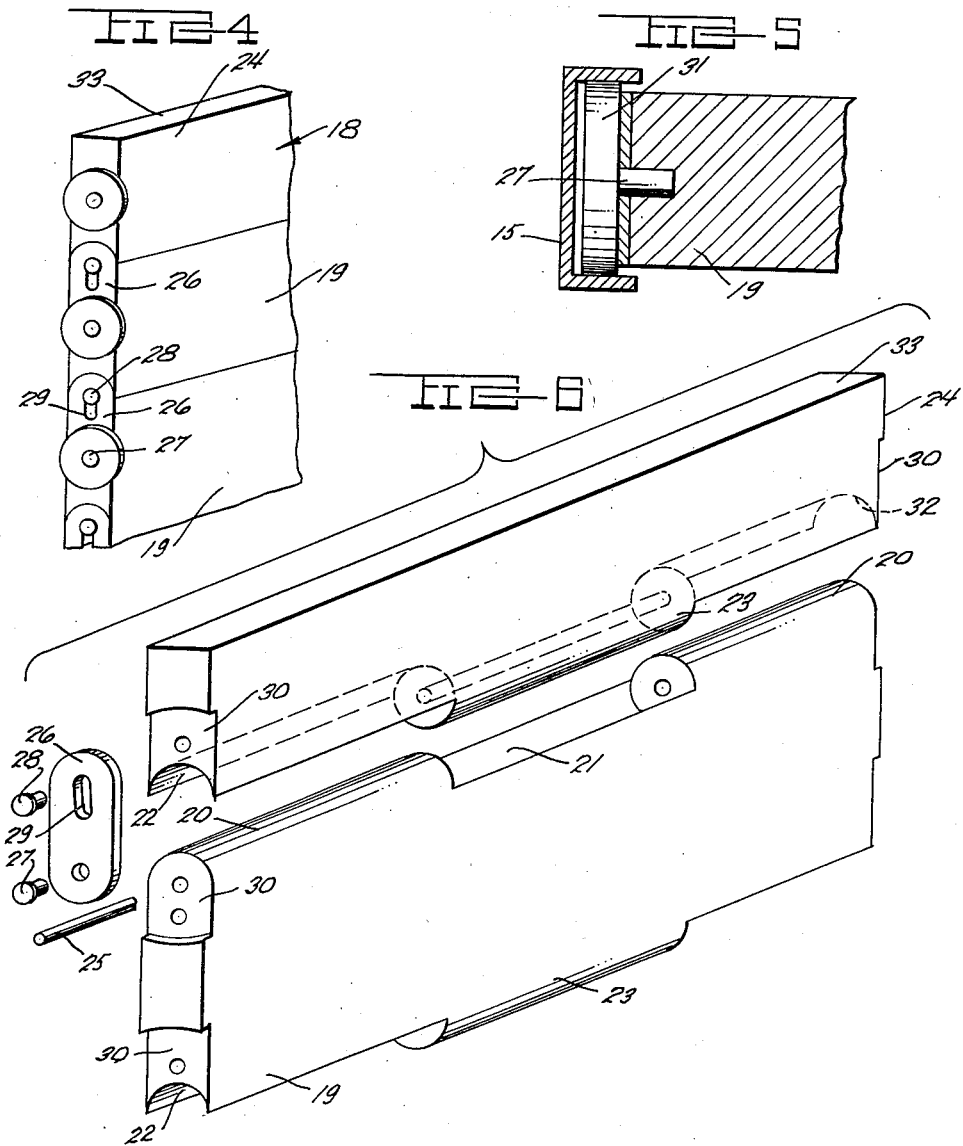

Patented Apr. 17, 1951

2,549,301

UNITED STATES PATENT OFFICE 2,549,301

ARTICULATED GRAIN CAR DOOR

Alton J. Ferrell, Houston, and Patrick J. McEnroe, Jr., Victoria, Tex.

Application July 19, 1949, Serial No. 105,596

2 Claims. (Cl. 160—201)

1

This invention relates to freight car doors, and more particularly to an auxiliary inside door for use on a freight car when the freight car is to be used for granular material, such as grain or the like.

A main object of the invention is to provide a novel and improved auxiliary inside sealing door for a freight car which may be permanently installed on the freight car, which can be stowed in the top of the car when not in use, which provides protection against leakage of grain or other granular material carried in the car, which is simple in construction, and which does not hamper the use of the car for other freight different in character from granular material.

A further object of the invention is to provide an improved inner door for a freight car which is easy to install, which is sturdy in construction, and which avoids the necessity of employing special inner doors or sealing devices around the said car doors when the car is to be employed for transporting grain or similar granular material.

Further objects and advantages of the invention will become apparent from the following description and claims, and from the accompanying drawings, wherein:

Figure 1 is a fragmentary side elevational view of a freight car provided with an inner door according to the present invention, the customary outer door of the car being shown in open position;

Figure 2 is a vertical transverse cross-sectional view taken on line 2—2 of Figure 1;

Figure 3 is an enlarged cross-sectional detail view taken on line 3—3 of Figure 1;

Figure 4 is an enlarged fragmentary perspective view of a top corner portion of the articulated door employed in the freight car of Figure 1;

Figure 5 is an enlarged cross-sectional detail view taken on line 5—5 of Figure 2;

Figure 6 is a perspective view showing the upper segments of the articulated door shown in Figure 1, said segments being illustrated in separated positions.

Referring to the drawings, 11 designates a conventional box car provided with doorways 12 and 12, and provided with the usual longitudinally-slidable doors 13 adjacent the doorways. Secured to the inside surfaces of the respective side walls of the car adjacent the respective side margins of the doorways 12 are the respective sets of opposing channel tracks 14 and 15, a pair of opposing tracks 14 being provided at one side doorway 12 and a pair of opposing tracks 15 being provided

2 at the opposite side doorway 12. The tracks 15 are bent horizontally at their top portions, as shown at 16, to transversely underlie the roof of the car and the tracks 14 are bent horizontally at their top portions to underlie the top track portions 16, as shown at 17. The horizontal top track portions 16 and 17 are secured to the car roof in any suitable manner.

Designated generally at 18 is an articulated inner door, one such door being carried in each set of opposed channel tracks 14 and 15. Each door comprises a plurality of elongated segment bars 19 hinged together at their longitudinal edges. As shown in Figure 6, each segment 19 has rounded top edge portion 20, 20, and between said rounded portions 20, 20 has a concave portion 21. Each segment 19 has respective concave bottom edge portions 22 coextensive in length with the rounded top edge portions 20. Between the concave bottom edge portions 22 is a rounded portion 23 coextensive in length with the concave, top edge portion 21. The top segment of the door, shown at 24, also has concave bottom edge portions 22, 22, between which is provided a rounded bottom edge portion 23. The rounded bottom edge portion 23 of each segment is rotatably received in the concave top edge portion 21 of the subadjacent segment and the concave bottom edge portions 22, 22 rotatably receive the rounded top edge portions 20, 20 of the subadjacent segment. A hinge bar 25 extends axially through the aligned rounded edge portions 20, 23 and 20 at each hinged joint between adjacent segments. Overlying each end of the hinge bar 25 is a strap bar 26 pivotally secured at its lower portion by a stud 27 to the edge of the lower segment and by a stud 28 to the edge of the upper segment. The upper portion of each strap bar 26 is slotted at 29 to receive the stud 28, whereby the upper segment is allowed to rotate freely with respect to the lower segment. Each segment is formed at its ends with recesses 30 in which the associated strap members are seated. Journaled on the respective studs 27 are rollers 31 which are rotatably received in the channel tracks 15 and 14. The top segment 24 of the door is similar to the segments 19, except that its top edge 33 is flat. The bottom segment of the door, shown at 32, in Figure 1, is formed with a flat bottom edge 34, shown in Figure 3. Secured to the intermediate portion of bottom segment 32 are spaced, outwardly-projecting lugs 35, 35, and pivoted thereto is a depending catch hook 36 which is lockingly engageable in an undercut recess 37 formed in the car floor, whereby the door may be locked in closed position.

The doors may be opened by disengaging the hooks 36 from the recesses 37 and lifting the doors upwardly along the channel tracks 14 and 15. The doors may be supported in the horizontal upper portions 16 and 17 of the channel tracks when not in use. When the doors are lowered to closed positions, the interior of the car is effectively sealed against leakage of material through the doorways, since the marginal portions of the door segments are relatively close to the walls of the channel tracks.

By employing articulated inner doors, as above described, no special wooden or paper sealers are required to be installed at the doorways when the car is employed to haul grain or similar granular material. The inner doors of the present invention are employed in conjunction with the normal outer doors, the outer doors acting as additional safety closures for the car. The articulated doors may be readily moved to their raised inoperative positions when their use is not required.

When freight in bags, sacks, or other frangible containers is carried, the articulated doors may be lowered to act as protective linings at the doorways to prevent damage to the bags or sacks by abrasion with the outer doors of the car.

The articulated inner doors may be constructed of components made of metal, wood or other suitable material having high durability, whereby said inner doors may be made permanent parts of the car structure.

While a specific embodiment of a grain door for use in freight cars has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a freight car having a doorway in one side thereof and a channel track extending along each side of said doorway and secured thereto, the tracks facing each other, a door positioned within said doorway and mounted in said tracks for up and down movement, said door comprising a plurality of bars arranged transversely of said doorway and in side by side relation and hingedly connected together along their facing sides, a strap bridging each of the ends of the adjacent bars and having one end connected to the end of one of said bars for rocking movement about a horizontal axis and having the other end connected to the end of the other of said bars for rocking and sliding longitudinal movements, and a roller rotatably supported on said horizontal axis and rollably engaging the adjacent one of said tracks.

2. In a freight car having a doorway in one side thereof and a channel track extending along each side of said doorway and secured thereto, the tracks facing each other, a door positioned within said doorway and mounted in said tracks for up and down movement, said door comprising a plurality of bars arranged transversely of said doorway and in side by side relation and hingedly connected together along their facing sides, a strap bridging each of the ends of the adjacent bars, a stud arranged transversely of and extending through said strap adjacent one end of the latter and fixed to the end of one of said bars, a roller rotatably supported on said stud and rollably engaging the adjacent one of said tracks, there being a longitudinally extending closed slot in said strap adjacent to the other end thereof, and a second stud arranged transversely of and extending through said slot and fixed to the end of the other of said bars.

ALTON J. FERRELL.
PATRICK J. McENROE, Jr.

REFERENCES CITED

The following references are of record in the file of this patent:

UNITED STATES PATENTS

| Number | Name | Date |
|---|---|---|
| 661,713 | Cockings | Nov. 13, 1900 |
| 1,427,915 | Sellgren | Sept. 5, 1922 |
| 1,508,886 | Dautrick et al. | Sept. 16, 1924 |
| 2,440,474 | Jackler et al. | Apr. 27, 1948 |